US012079019B2

(12) United States Patent
Gerber et al.

(10) Patent No.: US 12,079,019 B2
(45) Date of Patent: Sep. 3, 2024

(54) DIGITAL LDO PASSGATE ROTATION

(71) Applicant: TEXAS INSTRUMENTS INCORPORATED, Dallas, TX (US)

(72) Inventors: Johannes Gerber, Unterschleissheim (DE); Asif Qaiyum, Freising (DE); Fraj Gharib, Freising (DE); Christian Josef Sichert, Attenkirchen (DE); Ruediger Kuhn, Freising (DE); Frank Dornseifer, Freising (DE); Bernhard Wolfgang Ruck, Freising (DE)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/323,924

(22) Filed: May 18, 2021

(65) Prior Publication Data

US 2022/0374035 A1 Nov. 24, 2022

(51) Int. Cl.
*G05F 1/575* (2006.01)

(52) U.S. Cl.
CPC .................................... *G05F 1/575* (2013.01)

(58) Field of Classification Search
USPC ................................ 327/530, 538, 540–544
See application file for complete search history.

(56) References Cited

U.S. PATENT DOCUMENTS

| | | | | |
|---|---|---|---|---|
| 9,543,430 | B2 * | 1/2017 | Edwards | H01L 23/5228 |
| 9,766,678 | B2 * | 9/2017 | Muthukaruppan | G06F 1/3296 |
| 11,099,591 | B1 * | 8/2021 | Köse | G05F 1/59 |
| 11,493,945 | B1 * | 11/2022 | Wang | G05F 1/59 |
| 2015/0177796 | A1 * | 6/2015 | Bose | G06F 1/3296 713/300 |
| 2021/0132643 | A1 * | 5/2021 | Yoo | G05F 1/575 |

* cited by examiner

*Primary Examiner* — Thomas J. Hiltunen
(74) *Attorney, Agent, or Firm* — Brian D. Graham; Frank D. Cimino; Xianghui Huang

(57) ABSTRACT

A system includes a digital controller in a voltage regulator. The system also includes a passgate array including two or more passgate transistors, where the passgate array is configured to provide a load current to a load, and where the digital controller is configured to activate and deactivate each passgate transistor in the passgate array. The system also includes a feedback loop configured to provide an error signal to the digital controller, the error signal based on a difference between an output voltage of the voltage regulator and a programmed voltage for the voltage regulator. The digital controller is configured to activate or deactivate a passgate transistor based at least in part on the error signal. The digital controller is also configured to activate at least one passgate transistor and deactivate at least one passgate transistor responsive to a clock cycle.

17 Claims, 4 Drawing Sheets

DIGITAL LDO PASSGATE ROTATION

BACKGROUND

Linear voltage regulators are useful in power systems to receive a variable input voltage and to provide a stable, low-noise power supply. Conventionally, a linear voltage regulator requires a large voltage drop between the input of the regulator and the output of the regulator to operate properly. A relatively high-voltage input power supply is needed to generate this large voltage drop. Conversely, a low dropout (LDO) linear voltage regulator is a type of linear voltage regulator circuit that works well even when the output voltage is very close to the input voltage, resulting in improved power efficiency over conventional regulators. A digital LDO includes a digital controller that drives multiple passgates. The digital controller receives a representation of the digital LDO output voltage and calculates an error signal between the output voltage and a reference voltage. The digital controller controls the number of passgates that are turned on or off based on the error signal.

SUMMARY

In accordance with at least one example of the description, a method includes activating, with a controller, a first set of passgate transistors of an array in a first clock cycle, where the array is coupled to provide a load current to a load. The method also includes activating, with the controller, a second set of passgate transistors of the array in a second clock cycle, where the second set of passgate transistors is rotated with respect to the first set of passgate transistors.

In accordance with at least one example of the description, a system includes a digital controller in a voltage regulator. The system also includes a passgate array including two or more passgate transistors, where the passgate array is configured to provide a load current to a load, and where the digital controller is configured to activate and deactivate each passgate transistor in the passgate array. The system also includes a feedback loop configured to provide an error signal to the digital controller, the error signal based on a difference between an output voltage of the voltage regulator and a programmed voltage for the voltage regulator. The digital controller is configured to activate or deactivate a passgate transistor based at least in part on the error signal. The digital controller is also configured to activate at least one passgate transistor and deactivate at least one passgate transistor responsive to a clock cycle.

In accordance with at least one example of the description, a system includes a transistor array. The transistor array includes a drain of a transistor, where the drain includes one or more drain sections. The transistor array includes a source of the transistor, where the source includes one or more source sections that alternate, in a first direction, with the one or more drain sections. The transistor array includes a gate of the transistor, where the gate includes one or more gate sections. Each of the one or more gate sections couples a drain section to a source section, and each of the one or more gate sections couples the drain section to the source section in a second direction perpendicular to the first direction.

DETAILED DESCRIPTION

A digital LDO regulator may operate with a low dropout voltage, where the dropout voltage is the difference between the input voltage and the regulated output voltage. The LDO regulator may include a fractioned pass transistor. A fractioned pass transistor is a transistor that is segmented into smaller slices (referred to herein as passgates or passgate transistors). Each slice, or passgate, of the pass transistor is controlled by a digital controller. The digital controller executes executable code to turn on or off each passgate, and to control the number of passgates that are turned on or off based on an error signal provided by a feedback loop. The load current is divided across the passgates that are turned on, or active. If a small number of passgates are active, the portion of the load current flowing through each passgate may be higher. If a large number of passgates are active, the portion of the load current flowing through each passgate may be lower. Also, the current per passgate may vary due to process and temperature conditions and due to the voltage difference between the input voltage and output voltage. If a small number of passgates are active, the average electromigration (EM) stress is higher per passgate than if a larger number of passgates are active, due to the increased current flowing through the active passgates. EM is the transport of material caused by the gradual movement of ions in a conductor. EM stress reduces the reliability of circuits, and may lead to lost connections or chip failure. Higher EM stress may cause more failures in the passgates in the LDO regulator. Reducing average EM stress may increase the reliability and lifetime of the LDO regulator.

In examples herein, a digital controller rotates the active passgates during operation. Rotating the passgates includes varying which passgates are active and which passgates are inactive at each clock cycle. Rotating active passgates spreads out the operating load amongst many or all of the passgates over time, thereby reducing the average EM stress that each passgate experiences. Without passgate rotation, a small number of passgates may be used more often than other passgates, and those passgates that are used more often will face greater EM stress than the passgates that are rarely used. The digital controller may be programmed to select active passgates using any suitable rotation scheme. Also, with passgate rotation, a different configuration of transistors may be useful that allows more transistors to be placed in a given area. This configuration uses horizontal connections between transistor drains and transistor sources, as described below. The horizontal connections may be used because the EM stress is reduced with passgate rotation as described herein.

Figure 1:
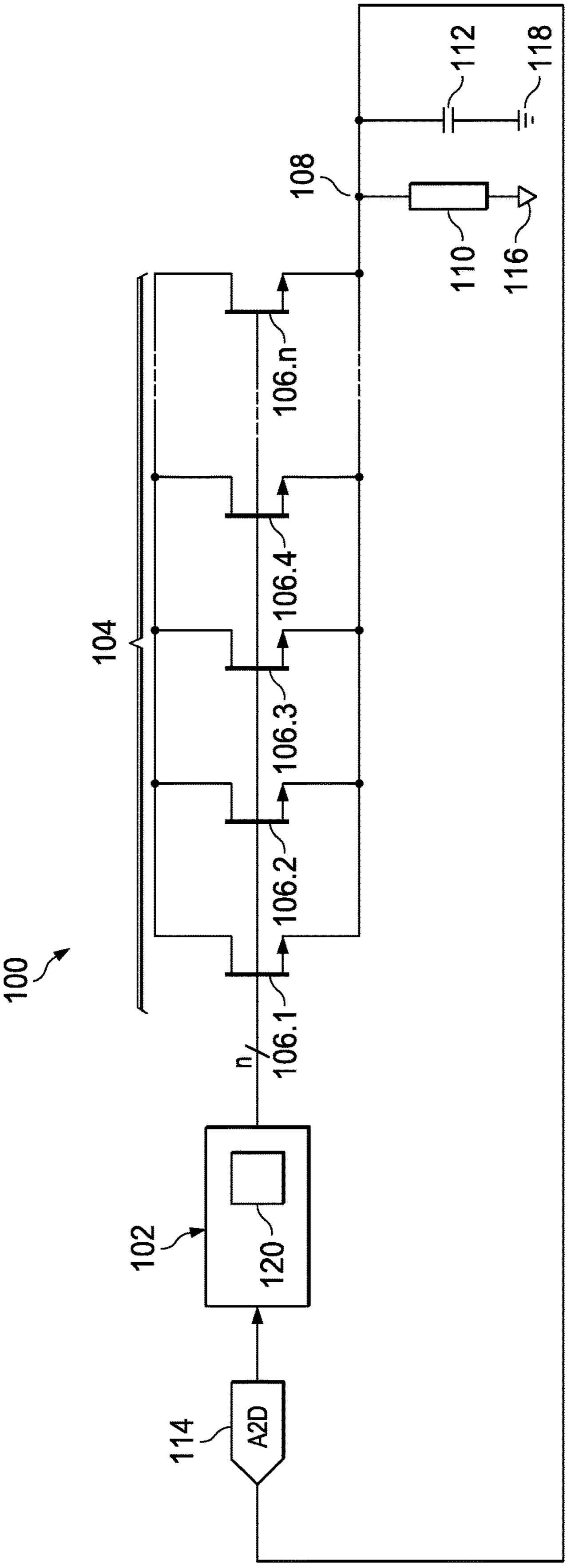
FIG. 1 is a block diagram of an LDO regulator system with a load in accordance with various examples.

FIG. 1 is a block diagram of an LDO regulator system 100 with a load, in accordance with various examples herein. System 100 includes a digital LDO regulator in this example. System 100 includes digital controller 102, passgate array 104, passgates 106.1-106. *n* (collectively, passgates 106), and output node 108. Load 110, capacitor 112, and analog to digital converter (ADC) 114 are also shown in system 100. Load 110 is a resistive load coupled between output node 108 and ground terminal 116, while capacitor 112 is coupled between output node 108 and ground terminal 118. Ground terminal 116 and ground terminal 118 may be at a common ground voltage in one example. Digital controller 102 includes executable code 120 in some examples, and the digital controller 102 performs some or all of the actions attributed herein to the digital controller 102 responsive to executing the executable code 120. The digital controller 102 is coupled to the gates of the passgates 106. In particular, the digital controller 102 is coupled to the gates of the passgates 106 individually so the digital controller 102 may activate or deactivate each passgate 106 individually. This configuration is indicated by the "n" notation and the slash in the connection between the digital controller 102 and the passgate array 104. The sources of the passgates 106 are coupled to output node 108. The drains of the passgates 106 are coupled to each other. Output node 108 is coupled to an input of the ADC 114, and an output of the ADC 114 is coupled to the digital controller 102.

The digital controller 102 controls the number of passgates 106 that are on. The LDO regulator and its passgate array 104 provide a target dropout voltage and load current, so the target load current is provided to a load 110 under a range of process conditions and operating conditions. Digital controller 102 turns passgates 106 on or off to provide the target load current.

Passgate array 104 may include any suitable number of passgates 106. In some examples, passgate array 104 includes 100 or more passgates 106. The active passgates 106 of passgate array 104 provide the load current to the load 110 at output node 108. Output node 108 is coupled to a feedback loop that is coupled to ADC 114. ADC 114 receives a feedback signal from the output node 108 and provides a digital representation of the output voltage at output node 108. The ADC 114 provides the digital representation of the output voltage to digital controller 102. Digital controller 102 calculates an error signal based on the digital representation. The error signal represents the difference between the voltage at output node 108 and the voltage the digital controller 102 is programmed to provide. Based on the error signal, digital controller 102 turns passgates 106 on or off to adjust the voltage at output node 108 to the programmed voltage value. If the error signal indicates that more passgates 106 are needed to provide the load current and output voltage, digital controller 102 activates one or more additional passgates 106. If the error signal indicates that fewer passgates 106 are needed to provide the load current and output voltage, digital controller 102 deactivates one or more passgates 106.

Load current is divided over all of the active passgates 106 in passgate array 104. If a large number of passgates 106 is active, the portion of the load current carried by each passgate 106 is lower. If a small number of passgates is active, the portion of the load current carried by each passgate 106 is higher. If the supply voltage is adequate to provide the load current, the passgates 106 are capable of conducting large amounts of current, and the temperature is within a normal operating range, then only a few, or even one, passgate 106 may be adequate to provide the load current. EM stress is higher per passgate 106 when fewer passgates 106 are in use.

In examples herein, digital logic is useful for rotating the passgates 106 that are active, so the EM stress is evenly distributed among all of the passgates 106 over time. Executable code 120 in digital controller 102 may cause the digital controller 102 to control the rotation of passgates 106. Digital controller 102 controls which passgates 106 are active to provide the programmed load current and output voltage. Executable code 120, executed by digital controller 102, selects the passgates 106 that are active by using a suitable rotation algorithm to rotate the passgates 106 that are active.

In one example, two passgates 106 are sufficient to provide the target load current and output voltage. Executable code 120 selects passgate 106.1 and 106.2 in a first clock cycle. In a second clock cycle, executable code 120 rotates passgates 106. More specifically, responsive to the feedback from the feedback loop indicating that two passgates 106 are still sufficient to provide the target output voltage and load current, digital controller 102 may rotate passgates 106 by deactivating passgate 106.1 and activating passgate 106.3. Therefore, in the second clock cycle, passgates 106.2 and 106.3 are active. In a third clock cycle, the digital controller 102 again rotates passgates 106. For example, responsive to two passgates 106 still being sufficient to provide the target output voltage and load current, the digital controller 102 deactivates passgate 106.2 and activates passgate 106.4. Thus, in the third clock cycle, passgates 106.3 and 106.4 are active. The digital controller 102 may continue to rotate passgates 106 in this manner during subsequent clock cycles.

Executable code 120 may include any suitable rotation algorithm to rotate passgates 106. In the example described above, executable code 120 inactivates one passgate 106 and activates a different passgate 106 in each clock cycle, if the number of passgates 106 needed to provide the target load current and voltage remains the same. In another example, digital controller 102 may inactivate more than one passgate 106 or activate more than one other passgate 106 in each clock cycle. For example, if six passgates 106 are active, digital controller 102 may inactivate two passgates 106 and activate two passgates 106 per clock cycle. In another example, digital controller 102 deactivates all active passgates 106 and activates a programmed number of inactive passgates 106 in each clock cycle. By rotating active passgates 106, the EM stress is spread out amongst most or all of passgates 106 in examples herein.

In another example, digital controller 102 activates and/or deactivates the number of active passgates 106 based on the error signal, while also rotating active passgates 106. For example, in a first clock cycle, two passgates 106.1 and 106.2 are sufficient to provide the target output voltage and load current. In a second clock cycle, digital controller 102 calculates the error signal and determines that three passgates 106 should be used to provide the target output voltage and load current instead of two passgates 106. Digital controller 102 may both rotate the active passgates 106 and activate an additional passgate 106. In this example, digital controller deactivates passgate 106.1 and activates passgates 106.3 and 106.4. At this time, three passgates 106 are active (106.2, 106.3, and 106.4). In another example, at a third clock cycle, digital controller 102 calculates the error signal and determines that two passgates 106 should be used to provide the target output voltage and load current instead of three passgates 106. Digital controller 102 may both rotate the active passgates 106 and deactivate one or more passgate 106. In this example, digital controller deactivates passgate 106.2 and 106.3, and activates passgate 106.5. After this action, two passgates 106 are active (106.4 and 106.5). In another example, digital controller 102 could have deactivated a passgate 106 to reduce the active passgates from 3 to 2 instead of deactivating and rotating. Different algorithms for selecting which passgates to activate or deactivate may be used in different embodiments.

Figure 2:
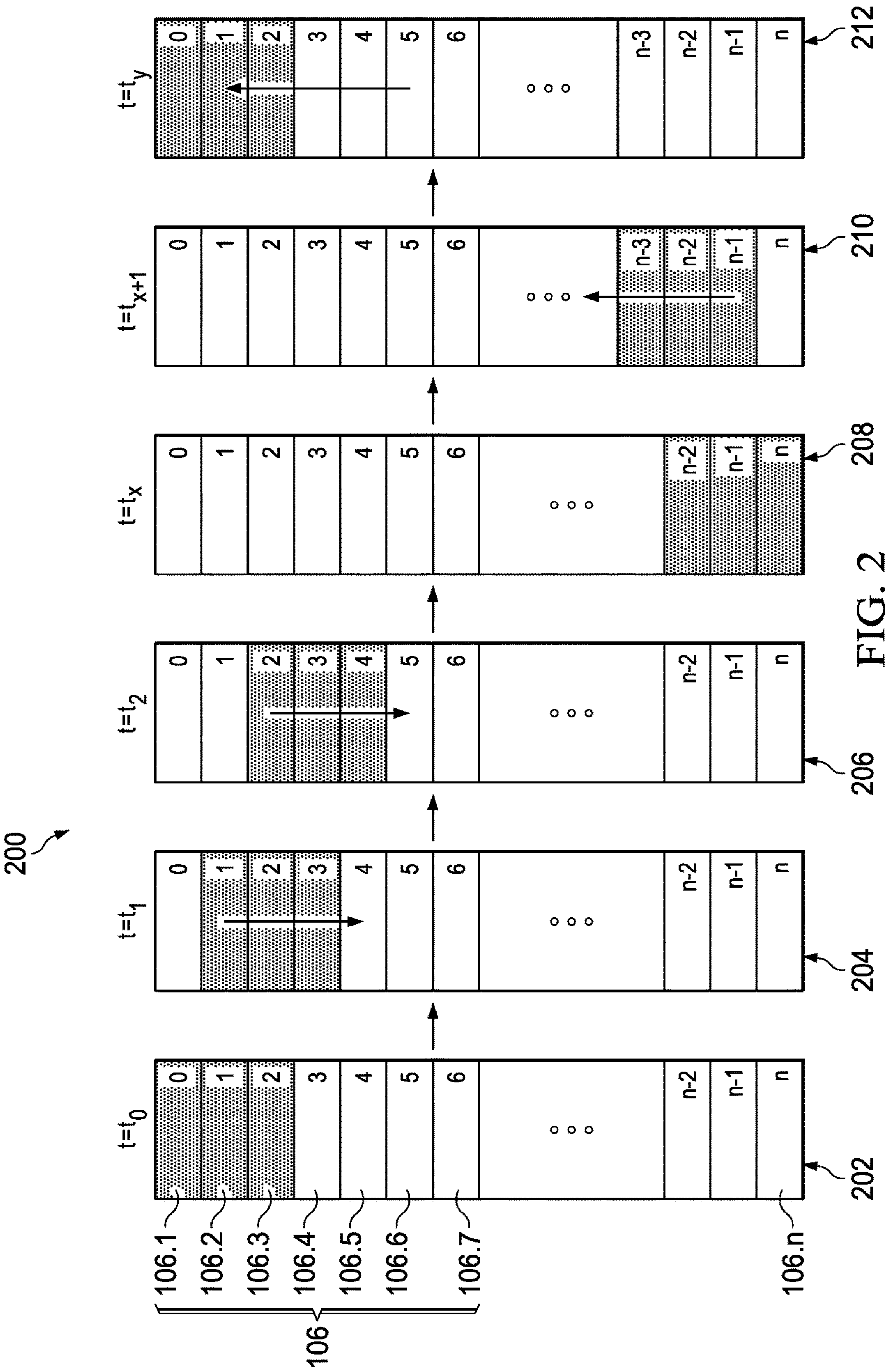
FIG. 2 is a block diagram of a passgate rotation scheme in an LDO regulator, in accordance with various examples.

FIG. 2 is a block diagram 200 of a passgate rotation scheme in accordance with various examples herein. The block diagram 200 includes matrices 202, 204, 206, 208, 210, and 212, with each matrix corresponding to a different clock cycle, and with the clock cycles of the matrices being consecutive, sequential clock cycles. Passgates 106 are represented as horizontal slices in block diagram 200. Passgates 106 are numbered 1 to n in this example, where n may be any number. Passgates 106.1, 106.2, 106.3, 106.4, 106.5, 106.6, 106.7, and 106.*n* (collectively, passgates 106) are labeled in matrix 202. Passgates 106 are referred to by their numerical label (0, 1, 2, 3, . . . n) in the description of FIG. 2. Active passgates 106 in each clock cycle are denoted with shading in FIG. 2, and non-shaded horizontal slices represent inactive passgates 106. In this example, three passgates 106 are active in each clock cycle (and, thus, in each matrix), although any number of passgates 106 may be active in other examples. Any suitable frequency may be used for the clock cycles. The frequency may be selected based on the performance parameters for the LDO regulator. Higher frequencies may be useful if the LDO regulator is used in an application where fast changes are applied to react quickly to changes in the load.

At time $t_0$, passgates 0, 1 and 2 are active, as shown in matrix 202. The remaining passgates are inactive. Digital controller 102 uses a rotation algorithm, such as that programmed in executable code 120, to select the active passgates in each clock cycle.

Matrix 204 shows the active passgates at time $t_1$. At time $t_1$, the active passgates are 1, 2, and 3. The remaining passgates are inactive. In this clock cycle, digital controller 102 has deactivated passgate 0 and activated passgate 3. At time $t_2$, matrix 206 shows the active passgates. At time $t_2$, passgates 2, 3, and 4 are active. In this clock cycle, digital controller 102 has deactivated passgate 1 and activated passgate 4. In this example, digital controller 102 continues to deactivate one passgate and activate one passgate in each clock cycle according to the pattern shown.

Matrix 208 shows the active passgates at a time $t_x$. At time $t_x$, digital controller 102 has continued to activate and deactivate passgates as described above and has reached the last passgate n. At time $t_x$, passgates n, n−1, and n−2 are active.

In matrix 210, at time $t_{x-1}$, digital controller 102 deactivates passgate n and activates passgate n-3. In this example, the active passgate rotation process entails the digital controller 102 activating and deactivating passgates one at a time from passgate n back toward passgate 0. In a next clock cycle (not shown in FIG. 2), passgate n-1 would be deactivated and passgate n-4 would be activated. The passgate rotation process may continue in this manner as long as the LDO regulator is in operation.

Matrix 212 shows the active passgates at a time $t_y$ when the active passgate rotation has returned to passgate 0. The active passgates are 0, 1, and 2, which are similar to the active passgates at time to as represented by matrix 202. The rotation process may then continue activating and deactivating passgates as shown at times $t_1$, $t_2$, etc., with the active passgates moving down the matrix of passgates again.

In this example, three passgates are active at each clock cycle. However, instead of always using passgates 0, 1, and 2 when three passgates are active, the active passgates are rotated to more evenly distribute the EM stress amongst all of the passgates. More evenly distributing the EM stress may reduce chip failures in some examples.

In this example, one passgate is activated and one passgate is deactivated in each clock cycle. However, in other examples, more than one passgate may be activated and deactivated. For instance, passgates 0, 1, and 2 may be active in a first clock cycle, while passgates 3, 4, and 5 are active in a second clock cycle. Any suitable rotation algorithm may be implemented by executable code 120 and digital controller 102. Also, executable code 120 may add to or subtract from the number of active passgates in each clock cycle based on the feedback received from the feedback loop of the LDO regulator. For example, 3 passgates may be active at time $t_0$, while a different number of passgates (2, 4, 5, etc.) may be active at time $t_1$. In each clock cycle, digital controller 102 may rotate passgates in any suitable manner, and/or adjust the number of active passgates in any suitable manner in examples herein.

Figure 3:
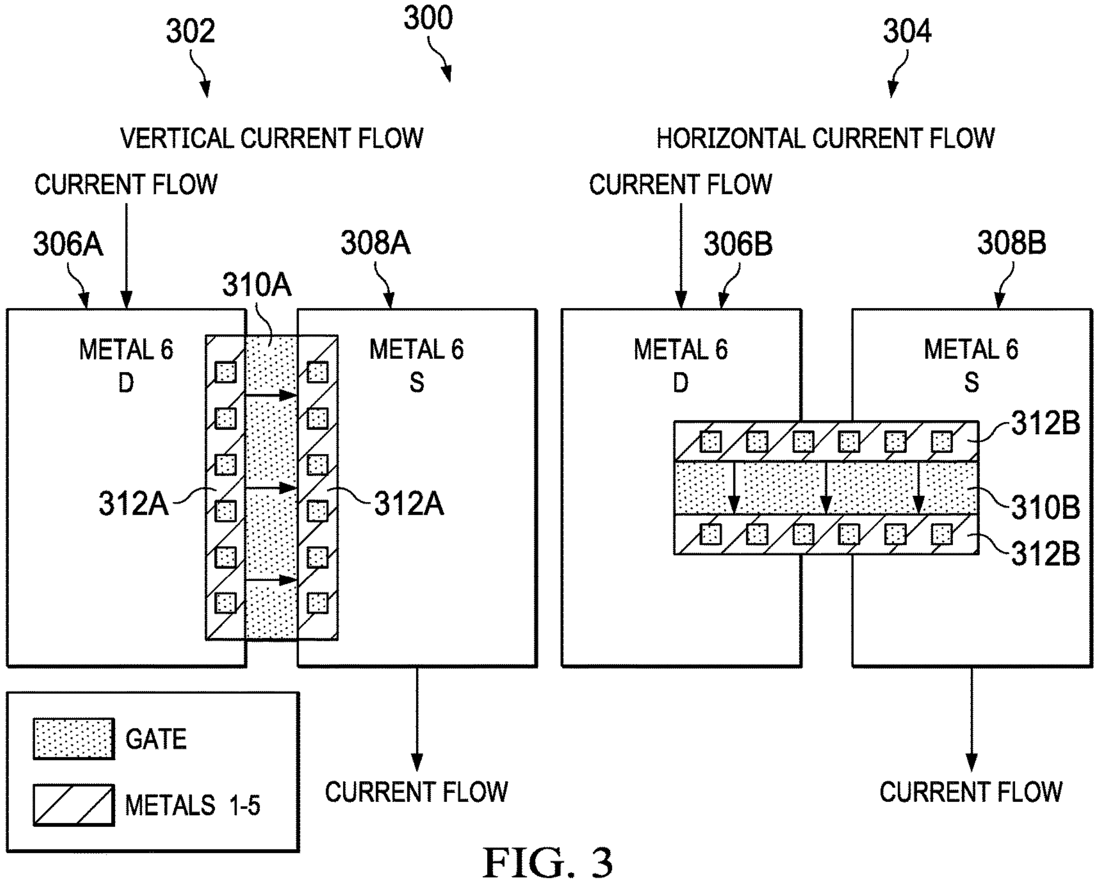
FIG. 3 is a block diagram of transistor configurations in an LDO regulator in accordance with various examples.

FIG. 3 is an example block diagram 300 of two transistor metallization configurations for use in coupling to passgate 106 devices in a passgate array 104. Configurations 302 and 304 show two different transistor metallization configurations that are oriented differently with respect to the underlying transistor and specifically the transistor's gate. Configuration 302 includes drain metal 6 306A, source metal 6 308A, gate 310A, and metals 1 to 5 312A (also referred to as metal layers 1-5). Configuration 304 includes drain metal 6 306B, source metal 6 308B, gate 310B, and metals 1 to 5 312B. Configuration 302 is an example of a structure in which current flows vertically through metals 1 to 5 312A. Configuration 304 is an example of a system in accordance with various examples herein, in which current flows horizontally through metals 1 to 5 312B. Current flows are represented with arrows in block diagram 300. The meanings of vertical and horizontal current flow are described below.

Metallization is a process used in the manufacture of integrated circuits (ICs). As an example, metallization is the process by which the components of ICs are interconnected by a conductor, such as aluminum. This process produces a thin-film metal layer that will serve as a conductor pattern for the interconnection of the various components on the chip. Multiple layers of metal may be used, such as metals 1 to 6. In configuration 302, metal 6 (306A, 308A) is on top and is generally a thicker layer. Metals 1 to 5 312A are below metal 6 (306A, 308A), and affect the current drive capability by about one-tenth of the effect of metal 6. Metals 1 to 5 312A are thinner than metal 6 (306A, 308A), and these lower level metals are often the weakest link in the current path, meaning that damage caused by EM stress may affect metals 1 to 5 312A more than metal 6 (306A, 308A). In an example operation, current flows into drain metal 6 306A on top of a drain, and then through metals 1 to 5 312A, into the drain. Current flows from the drain, through gate 310A, to the source, then through metals 1 to 5 312A, and then back to source metal 6 308A on top of the source. Metal 1, for example, is thinner than metal 6 (306A, 308A) and may not be able to withstand the EM stress that metal 6 (306A, 306B) may withstand. Metal 1 may be able to handle one-tenth the EM stress that metal 6 (306A, 308A) is capable of handling in one example. Accordingly, a bottleneck in terms of EM performance may occur in the metal 1 layer, as current flows through metal 1 before it enters the transistor. In configuration 302, current flows downward from drain metal 6 306A, through metal layers 5, 4, 3, 2, and 1, and then to the drain. Current then flows from the drain to gate 310A. In this example, current does not flow laterally through metal layer 1, because metal layer 1 may not be able to handle the EM stress in the conventional LDO regulator. Instead, the current flows vertically through metal layers 1 to 5 312A, which reduces the EM stress those layers undergo compared to a lateral flow of current. The vertical connection between drain and source is useful in the conventional LDO regulator without passgate rotation to reduce EM stress in the lower metal layers. However, this vertical connection uses more area to implement, and therefore fewer transistors may be fabricated into a given area.

Configuration 304 uses a horizontal connection between drain and source rather than the vertical connection in configuration 302. The horizontal connection allows more transistors to be fabricated into a given area than the vertical connection, but the horizontal connection also has lateral current flow through the metal 1 layer. However, in accordance with various examples herein, passgate rotation is used to reduce the average EM stress that each passgate transistor undergoes. By reducing the average EM stress per passgate using passgate rotation, the vertical connection of configuration 304 may be used without increasing the failure rate of the passgate transistors. Therefore, the area for a given number of transistors may be reduced by using passgate rotation according to examples herein.

In configuration 304, current flows into drain metal 6 306B on top of a drain, and then through metals 1 to 5 312B, into the drain. Current flows from the drain, through gate 310B, to the source, then through metals 1 to 5 312B, and then back to source metal 6 308B on top of the source. As shown in configuration 304, current flows laterally through metals 1 to 5 312B, then through the drain, gate 310B, and source, and then again laterally through metals 1 to 5 312B, and to source metal 6 308B. The lateral flow of current through metals 1 to 5 312B may have a higher EM stress than the vertical flow of current through metals 1 to 5 312A of configuration 302. However, if passgate rotation is used as described herein, the EM stress is distributed among all the passgate transistors, and thus few or none of the passgate transistors receives a disproportionate amount of EM stress. The use of passgate rotation reduces the chances of transistor failure and other chip failures according to examples herein, which allows for a horizontal configuration like configuration 304B that reduces transistor area.

Figure 4:
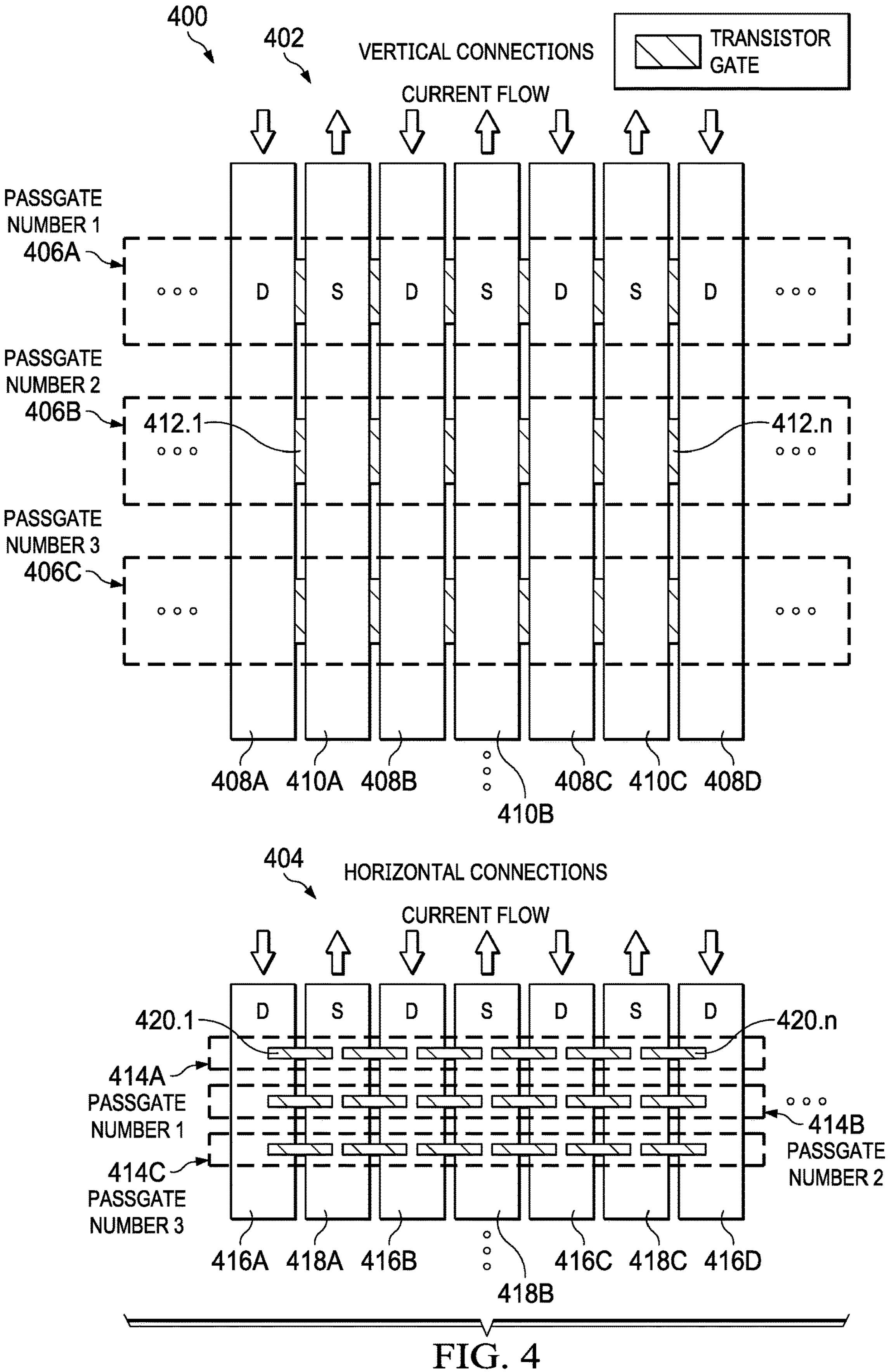
FIG. 4 is a block diagram of transistor arrays in an LDO regulator in accordance with various examples.

FIG. 4 is an example block diagram 400 of transistor arrays such as passgate arrays 104 in accordance with various examples herein. Configurations 402 and 404 show two different transistor arrays. Configuration 402 is a configuration with vertical connections between drain and source sections of a transistor. Configuration 402 is a configuration without passgate rotation, and the vertical configuration of the transistors is similar to configuration 302 described above with respect to FIG. 3. In contrast, configuration 404 is a configuration in accordance with various examples herein, and has horizontal connections between drain and source sections of the transistor. Configuration 404 uses passgate rotation, and is similar to configuration 304 described above with respect to FIG. 3.

Configuration 402 includes passgates 406A, 406B, and 406C (collectively, passgates 406). Configuration 402 includes a drain connection that includes drain connection sections 408A, 408B, 408C, and 408D (collectively, drain connection sections 408). Configuration 402 includes a source connection that includes source connection sections 410A, 410B, and 410C (collectively, source connection sections 410). Gates 412.1 to 412.*n* are also shown in configuration 402 (collectively, gates 412). Configuration 402 includes four drain connection sections 408 and three source connection sections 410 in this example, but other numbers of drain connection sections 408 and source connection sections 410 may be used in other examples. Configuration 404 includes passgates 414A, 414B, and 414C (collectively, passgates 414). Configuration 404 includes a drain connection that includes drain connection sections 416A, 416B, 416C, and 416D (collectively, drain connection sections 416). Configuration 404 includes a source connection that includes source connection sections 418A, 418B, and 418C (collectively, source connection sections 418). Gates 420.1 to 420.*n* (collectively, gates 420, also referred to herein as gate sections) are also shown in configuration 404. Configuration 404 includes four drain connection sections 416 and three source connection sections 418 in this example, but other numbers of drain connection sections 416 and source connection sections 418 may be used in other examples.

Referring again to configuration 402, passgates 406 are composed of sections (also referred to as "slices" or "fingers") of drain and source areas. Seven drain sections and source sections are shown here for simplicity. The drain sections and source sections are coupled to one another via gates 412.1 to 412.*n*. Passgates 406 are fabricated in sections as shown due to the fabrication techniques used and the properties of the materials that make up the passgates 406. For example, passgate 406A includes several drain sections (coupled to drain connection sections 408) and several source sections (coupled to source connection sections 410), coupled to one another via gates 412. Each passgate 406 has a similar structure to passgate 406A. Each passgate 406 is represented by a horizontal, dashed rectangular box in configuration 402. Current flow through drain sections and source sections is represented by the arrows at the top of the figure. Configuration 402 provides vertical connections between drain sections and source sections.

Configuration 404 is an example of a horizontal configuration, with horizontal gates 420 connecting drain sections (coupled to drain connection sections 416) and source sections (coupled to source connection sections 418). The horizontal connections in configuration 404 are similar to configuration 304 described above with respect to FIG. 3. In configuration 404, the drain connection sections 416 (along with the drain sections) and the source connection sections 418 (along with the source sections) are oriented in a first direction, while the gates 420 are oriented in a second direction, approximately perpendicular to the drain connection sections 416 and source connection sections 418. Configuration 404 shows how passgates 414 may be fabricated that take up less transistor area by using the horizontal configuration. Configuration 402 and configuration 404 each show three passgates (406 and 414, respectively). The three passgates 406 in configuration 402 take up a much greater area than the three passgates 414 in configuration 404, due to the vertical connections in configuration 402. Therefore, with the horizontal connections in configuration 404, transistor area may be reduced. The area reduction for configuration 404 compared to configuration 402 may be up to 60% in some examples. Also, horizontal connections may be used without increasing damage from EM stress due to passgate rotation according to the various examples herein.

Figure 5:
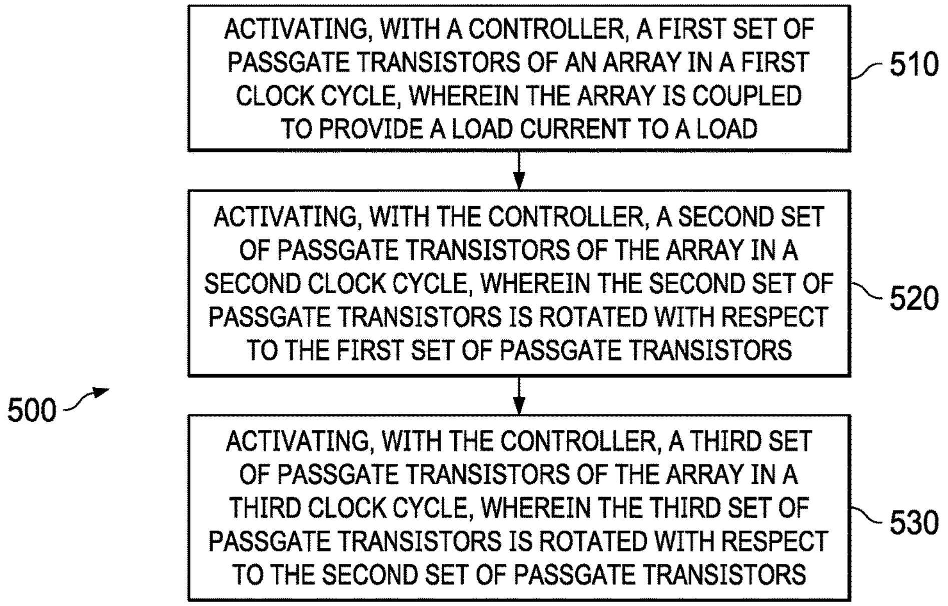
FIG. 5 is a flow diagram of a method for passgate rotation in an LDO regulator in accordance with various examples.

FIG. 5 is a flow diagram of a method 500 for passgate rotation in accordance with various examples herein. The steps of method 500 may be performed in any suitable order. The hardware components described above with respect to FIG. 1 may perform method 500 in one example, such as digital controller 102.

Method 500 begins at 510, where a controller activates a first set of passgate transistors coupled in a passgate array in a first clock cycle, where the array is coupled to provide a load current to a load. As described above, digital controller 102 activates one or more passgates 106 to provide the load current to load 110. In an example, digital controller 102 determines that three passgate transistors will provide an adequate load current based on a feedback signal, so the first set of passgate transistors includes three passgate transistors that are activated. In other examples, the first set of passgate transistors may include a number other than three transistors.

Method 500 continues at 520, where digital controller 102 activates a second set of passgate transistors coupled in the passgate array in a second clock cycle. In this example, digital controller 102 performs passgate rotation with executable code 120 such that the second set of passgate transistors is rotated with respect to the first set of passgate transistors. Similar to the first set of passgate transistors, the number of active transistors in the second set are based on the feedback signal, but due to passgate rotation, the specific transistors activated and deactivated in the first and second sets are different. The second set of passgate transistors may include any number of passgate transistors. Which transistors are activated and deactivated may be re-determined each clock cycle according to a rotation algorithm. The rotation algorithm averages the EM stress across the passgates 106 in passgate array 104 rather than using certain passgates 106 more than others.

Method 500 continues at 530, where digital controller 102 activates a third set of passgate transistors coupled in the passgate array in a third clock cycle. The number of active transistors in the third set are based on the feedback signal, and the specific active transistors in the third set may be rotated with respect to the second set.

Examples herein reduce EM stress among passgates 106 by using passgate rotation. With reduced EM stress, passgates 106 may be configured with horizontal gate connections between drain sections 416 and source sections 418 as shown in configuration 404 in FIG. 4. With configuration 404, transistor area may be reduced compared to alternative solutions.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitor, respectively, coupled in parallel between the same nodes. For example, a resistor or capacitor shown and described herein as a single component may instead be multiple resistors or capacitor, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means +/−10 percent of the stated value. Modifications are possible in the described examples, and other examples are possible within the scope of the claims.

What is claimed is:

1. A system, comprising:

a passgate array including a first passgate transistor, a second passgate transistor, a third passgate transistor, and a fourth passgate transistor; and a controller is configured to:

receive a feedback signal from the passgate array;

generate an error signal based on the feedback signal;

based on the error signal, determine a first number of passgate transistors to activate in a first clock cycle;

based on the first number, activate the first passgate transistor and the second passgate transistor in the first clock cycle;

received an updated feedback signal from the passgate array;

generate an updated error signal from the updated feedback signal;

based on the updated error signal, determine a second number of passgate transistors to activate in a second clock cycle;

based on the second number, deactivate the first passgate transistor and activate the third passgate transistor and the fourth passgate transistor in the second clock cycle;

received a next updated feedback signal from the passgate array;

generate a next updated error signal from the next updated feedback signal;

based on the next updated error signal, determine a third number of passgate transistors to activate in a third clock cycle; and based on the third number, deactivate the fourth passgate transistor and activate the second passgate transistor in the third clock cycle.

2. The system of claim 1, wherein the passgate array is configured to implement a low dropout (LDO) voltage regulator.

3. The system of claim 1, further comprising:
an analog-to-digital converter configured to generate the feedback signal.

4. A system, comprising:
a plurality of transistors including a first, a second, and a third transistors; and
a controller coupled to the plurality of transistors and configured to:
turn on the first and second transistors to generate a first output voltage;
determine a first number of transistors to be turned on based on the first output voltage;
based on the first number, turn off the first transistor, keep the second transistor on, and turn on the third transistor to generate a second output voltage;
determine a second number of transistors to be turned on based on the second output voltage; and
based on the second number, turn off the third transistor, keep the second transistor on, and turn on the first transistor.

5. The system of claim 4, wherein the plurality of transistors further includes a fourth transistor, and wherein the controller is further configured to:
based on the second number, turn on the fourth transistor in addition to the first transistor.

6. The system of claim 4, wherein the plurality of transistors is configured to implement a low dropout (LDO) voltage regulator.

7. The system of claim 4, wherein to determine the first number, the controller is configured to:
determine an error value based on the first output voltage; and
determine the first number based on the error value.

8. The system of claim 7, wherein to determine the error value, the controller is configured to:
receive a first value representing the first output voltage;
receive a second value representing a target value for the first output voltage; and
determine the error value based on the first and second values.

9. The system of claim 8, further comprising:
an analog-to-digital converter configured to generate the first value based on measurement of the first output voltage.

10. The system of claim 4, wherein:
the first and second transistors are turned on during a first clock cycle;
the first transistor is turned off and the third transistor is turned on during a second clock cycle; and
the third transistor is turned off and the first transistor is turned on during a third clock cycle.

11. A method, comprising:
turning on, using a controller, a first and a second transistors of an array of transistors to generate a first output voltage, wherein the array of transistors further includes a third transistor;
determining, using the controller, a first number of transistors to be turned on based on the first output voltage;
turning off the first transistor, keep the second transistor on, and turning on the third transistor, using the controller based on the first number, to generate a second output voltage;
determining, using the controller, a second number of transistors to be turned on based on the second output voltage; and
turning off the third transistor, keep the second transistor on, and turning on the first transistor, using the controller based on the second number.

12. The method of claim 11, wherein the array of transistors further includes a fourth transistor, and wherein the method further comprises:
turning on the fourth transistor in addition to the first transistor, using the controller based on the second number.

13. The method of claim 11, wherein the array of transistors is part of a low dropout (LDO) voltage regulator.

14. The method of claim 11, wherein determining the first number comprises:
determining an error value based on the first output voltage; and
determining the first number based on the error value.

15. The method of claim 14, wherein determining the error value comprises:
receiving a first value representing the first output voltage;
receiving a second value representing a target value for the first output voltage; and
determining the error value based on the first and second values.

16. The method of claim 15, further comprising:
generating, using an analog-to-digital converter, the first value based on measurement of the first output voltage.

17. The method of claim 11, wherein:
the first and second transistors are turned on during a first clock cycle;
the first transistor is turned off and the third transistor is turned on during a second clock cycle; and
the third transistor is turned off and the first transistor is turned on during a third clock cycle.

* * * * *